United States Patent [19]

Kogawa

[11] Patent Number: 4,541,060
[45] Date of Patent: Sep. 10, 1985

[54] PATH CONTROL METHOD AND APPARATUS

[75] Inventor: Takashi Kogawa, Sakura, Japan

[73] Assignee: Hitachi, Ltd., Tokyo, Japan

[21] Appl. No.: 517,288

[22] Filed: Jul. 26, 1983

[30] Foreign Application Priority Data

Jul. 31, 1982 [JP] Japan .............................. 57-135172

[51] Int. Cl.³ .................... B25J 9/00; G06F 15/46
[52] U.S. Cl. ................................ 364/513; 364/169;
364/191; 318/573; 318/574; 901/14; 901/18
[58] Field of Search .................... 364/513, 191–193,
364/169; 318/568, 573, 574; 901/14, 18

[56] References Cited

U.S. PATENT DOCUMENTS

| | | | |
|---|---|---|---|
| Re. 30,132 | 10/1979 | Irie | 318/568 |
| 3,661,051 | 5/1972 | Dunne et al. | 364/513 |
| 3,920,972 | 11/1975 | Corwin, Jr. et al. | 364/513 |
| 4,348,731 | 9/1982 | Kogawa | 364/513 |
| 4,456,961 | 6/1984 | Price et al. | 364/513 |

Primary Examiner—Jerry Smith
Assistant Examiner—John R. Lastova
Attorney, Agent, or Firm—Beall Law Offices

[57] ABSTRACT

A path control method and apparatus which are well-suited especially for application to articulated machine tools and industrial robots having path-controlled parts, using commands calculated from teach point information and orders calculated from the commands by operations performed without coordinate transformations so that a large number of path points can be evaluated without considerably lengthening an operating period of time.

56 Claims, 6 Drawing Figures

PATH CONTROL METHOD AND APPARATUS

BACKGROUND OF THE INVENTION

The present invention relates to a path control method and apparatus which are well-suited especially for application to articulated machine tools and industrial robots having path-controlled parts (parts whose paths are to be controlled) movable within three-dimensional regions.

A path-controlled part is controlled in such a way that principal points concerning movement paths are stored as teach points in memory means in advance, and that an interpolation operation is performed by reading out the stored information. The interpolation operation becomes more complicated with increase in the number of movable axes included from a base to the path-controlled part. When industrial robots are taken as an example, recently they have five movable axes as the general trend. Further, robots of 6-axis setup are coming into wide use. Accordingly, the period of time required for the interpolation operation tends to lengthen more.

Industrial robots and machine tools are often required to perform operations for various functions, besides the operations for the path control.

The operations are executed by microcomputers in many cases. The microcomputers are inexpensive, but they do not have very high operating capabilities. In the controls of the industrial robots and machine tools, it is the actual situation that the capabilities are utilized substantially fully. On the other hand, however, it is requested to perform a preciser control by executing the interpolation operation finely and lessening the meandering of the moving path.

SUMMARY OF THE INVENTION

An object of the present invention is to provide a path control method which can shorten interpolating time intervals without considerably increasing a period of time required for an interpolation operation, and to construct an apparatus therefor.

In the present invention, main path points expressed by a general coordinate system are obtained from a teach point information signal (hereafter "teach point information"), and a command signal (hereafter "command") expressed in the reference coordinate system of a moving object is obtained from the main path point information. In addition, at least one order expressed in the reference coordinate system of the moving object is obtained between such commands. The command has heretofore been evaluated, and a long operating time is taken for the evaluation because a coordinate transformation must be done. Since, however, the order can be executed by the four fundamental rules of arithmetic, it can be evaluated in a time much shorter than the time for evaluating the command. Accordingly, even when the time for evaluating the order is added to the time for evaluating the command, the total becomes slightly longer than the latter time.

In the present invention, since the order is obtained between the commands adjoining each other along a path, a cycle for evaluating the command can also be made somewhat longer than in the prior art. Thus, the period of time required for the operation of path interpolation can also be made equal to, or rather shorter than, that in the prior art.

DESCRIPTION OF THE PREFERRED EMBODIMENTS

Figure 1:
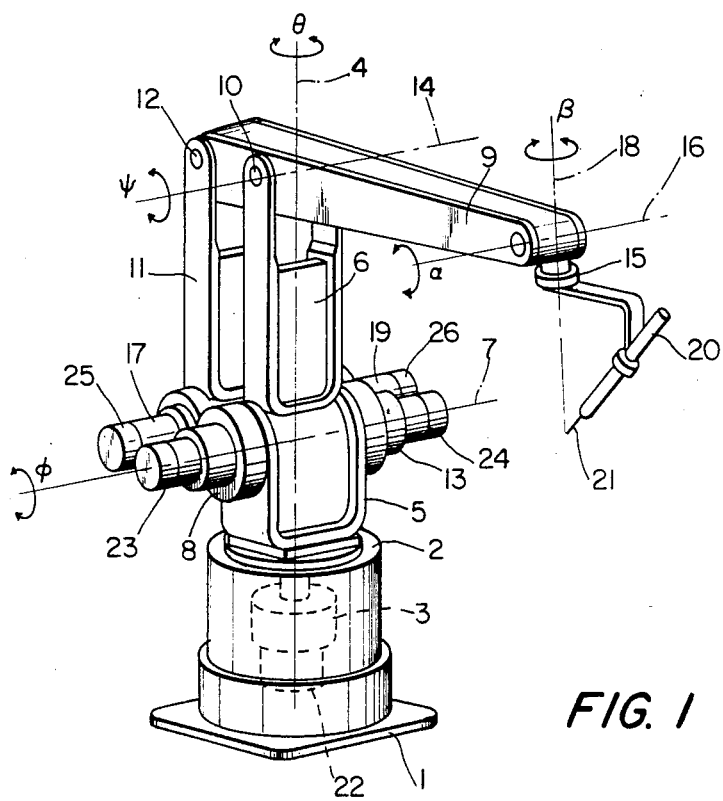
FIG. 1 is a perspective view showing an example of an industrial robot which is controlled by a path control method according to the present invention.

Referring now to the drawings, there will be described a case where the present invention is applied to an industrial robot.

In FIG. 1, numeral 1 designates a base, and numeral 2 a turntable. This turntable is turnable in a direction $\theta$ indicated by arrows about a vertical axis 4 by drive means 3 which is disposed thereunder.

A U-shaped holder 5 is fixed on the turntable 2. A first arm 6 is supported so as to be turnable in a direction $\phi$ about an axis 7. Shown at numeral 8 is a drive means for driving the first arm 6 in the direction $\phi$. A second arm 9 is pivotally mounted on the upper end of the first arm 6 through a pin 10. Disposed in parallel with the first arm 6 is a rear lever 11, one end of which is pivotally mounted on the second arm 9 through a pin 12 and the other end of which is pivotally mounted on one end of a lower lever, not shown, through a pin, not shown. The other end of the lower lever, not shown, is driven on the axis 7 by drive means 13. The first arm 6, second arm 9, rear lever 11 and lower lever constitute a parallelogram link. Accordingly, when the drive means 13 is actuated, the second arm 9 is rotated in a direction $\Psi$ about the axis 14 of the pin 10.

The pivotal points between the rear lever 11 and the lower lever, not shown, are provided with drive means 17 for rotating a wrist 15 in a direction $\alpha$ about an axis 16 and drive means 19 for rotating the wrist 15 in a direction $\beta$ about an axis 18.

A welding torch 20 is attached to the wrist 15, and the intersection point 21 between the axis of this torch and the axis 18 is a path-controlled part (a part whose path is to be controlled). Thus, the moving object includes the five axes consisting of the axis 4 of the turntable 2, the axis 7 of the first arm 6, the axis 14 of the second arm 9 and the two axes 16, 18 of the wrist 15.

Encoders 22, 23, 24, 25 and 26 as position detecting means are respectively installed on the drive means 3, 8, 13, 17 and 19 so as to detect the rotational angles of the corresponding drive means.

While, in the above, the mechanism of the articulated industrial robot shown in FIG. 1 has been described, the characterizing feature of the present invention do not reside in the mechanism. Accordingly, the mechanism is not restricted to that shown in FIG. 1, but it may be any of the mechanisms of the Cartesian coordinate type, polar coordinate type, cylindrical coordinate type, etc. The member to be attached to the wrist 15 is not restricted to the welding torch, either. The mechanism illustrated in FIG. 1 is described more in detail in U.S.

patent application Ser. No. 196,252, filed on Oct. 10, 1980.

Figure 2:
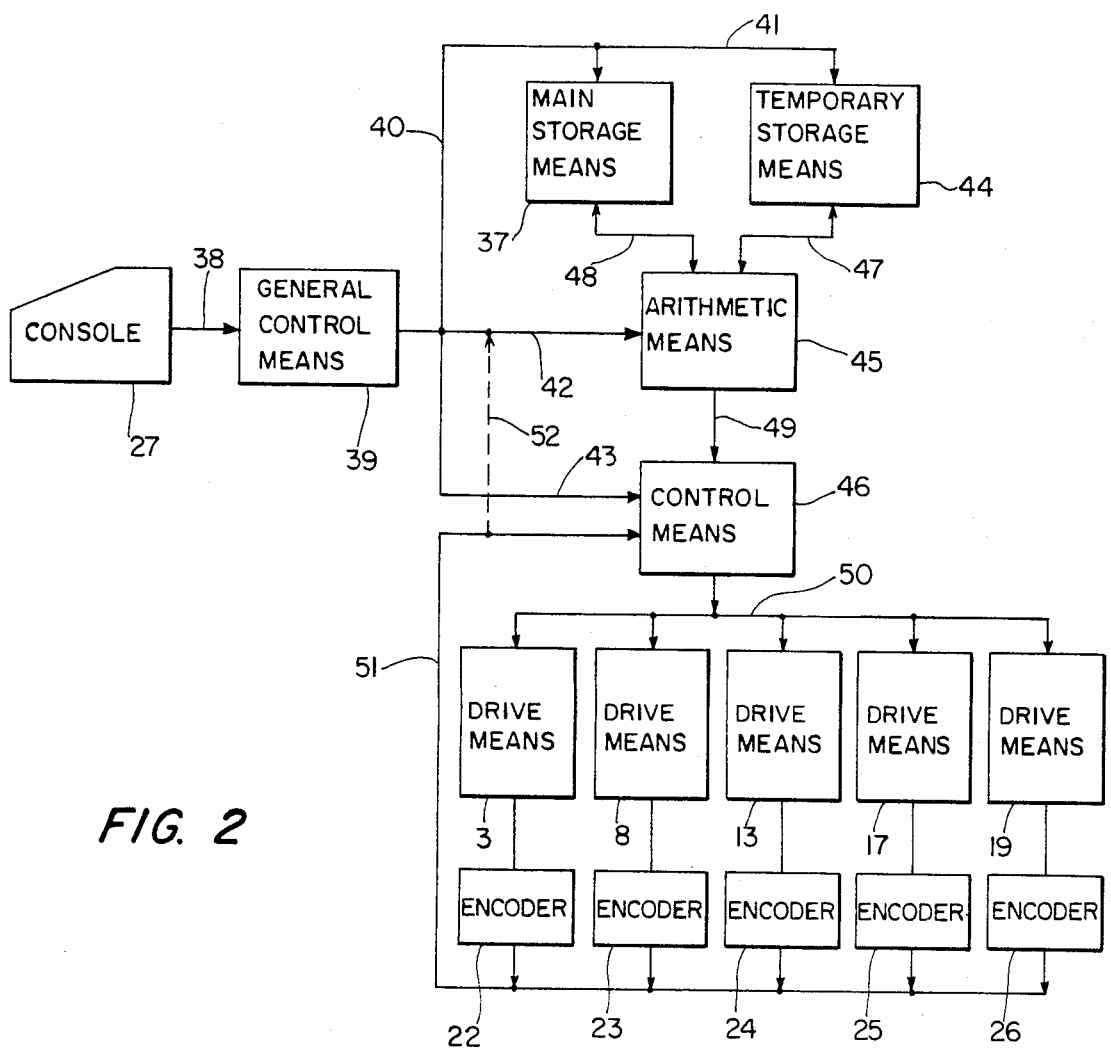
FIG. 2 is a block circuit diagram showing an embodiment of a path control apparatus according to the present invention.

FIG. 2 is a block diagram showing an example of a control device for controlling the mechanism shown in FIG. 1. Now, reference is had to this diagram.

Numeral 27 designates a console. This console 27 is shown in front elevation in FIG. 3, and has a switch 28 for supplying electric power to the whole robot, a switch 29 for changingover a teaching mode and an automatic operation mode and an automatic operation mode and switches 30, 31, 32, 33, 34 and 35 required for teaching. The switches 30, 31 and 32 are three-position change-over switches for shifting the path-controlled part 21 in the directions of $+X.-X$, $+Y.-Y$ and $+Z.-Z$, respectively; the switches 33 and 34 are three-position changeover switches for actuating the drive means 17 and 19 so as to move the wrist 15 in the directions of $+\alpha.-\alpha$ and $+\beta.-\beta$, respectively; and the switch 35 is a switch which is thrown on a side Pe when only the posture of the moving object is changed without changing the position of the path-controlled part 21.

Figure 3:
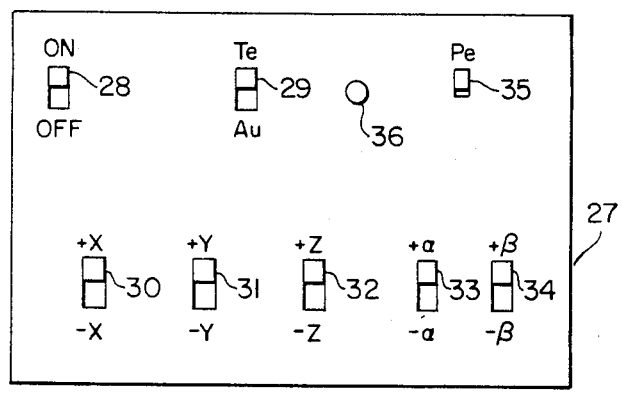
FIG. 3 is a front elevation showing an example of the panel arrangement of a console shown in FIG. 2.

Shown at numeral 36 in FIG. 3 is a push button which is depressed when teach points are written into main storage means 37.

The console 27 is connected to general control means 39 through a line 38.

The general control means 39 generally controls the main storage means 37, temporary storage means 44, arithmetic means 45 and control means 46 through lines 40, 41, 42 and 43. In addition, the general control means 39 provides timing pulses. The main storage means 37 stores the teach points as stated before. The temporary storage means 44 temporarily stores commands through a line 47. The arithmetic means 45 evaluates a main path point on the basis of the information of the adjacent teach points inputted from the main storage means through a line 48, calculates commands for the respective drive means 3, 8, 13, 17 and 19 necessary for moving the path-controlled part 21 to this main path point, and processes the adjacent commands so as to obtain an order defining an intermediate point by interpolating between these commands. Further, when any of the change-over switches 30, 31 and 32, for example, the switch 30 is thrown on the $+X$ side, the arithmetic means 45 executes an operation necessary for moving the pathcontrolled part 21 in the $+X$ direction.

The control means 46 receives the commands and orders through a line 49 from the arithmetic means 45, and successively gives the differences between them and the outputs of the encoders 22–26 to the corresponding drive means 3, 8, 13, 17 and 19 through a line 50. Shown at numeral 51 is a line which connects the encoders 22–26 with the control means 46.

When, for example, the change-over switch 30 is thrown onto the $+X$ side with the change-over switch 29 thrown on the teaching mode side Te, the resulting signal is applied to the arithmetic means 45 through the lines 38 and 42. The arithmetic means 45 performs an operation necessary for moving the path-controlled part 21 in the $+X$ direction, by substituting $x=$const. and $\Delta y1=\Delta z1=0$, $\Delta\alpha1=0$, $\Delta\beta1=0$ into Equation (1):

$$\begin{pmatrix} \Delta\theta_l \\ \Delta\phi_l \\ \Delta\psi_l \\ \Delta\alpha_l \\ \Delta\beta_l \end{pmatrix} = \begin{pmatrix} a_{11}\,a_{12}\ldots a_{15} \\ a_{21}\,a_{22}\ldots a_{25} \\ \phantom{a_{11}}\ldots a_{35} \\ \phantom{a_{11}}\ldots a_{45} \\ a_{51}\,a_{52}\ldots a_{55} \end{pmatrix}^{-1} \begin{pmatrix} \Delta x_l \\ \Delta y_l \\ \Delta z_l \\ \Delta\alpha_l \\ \Delta\beta_l \end{pmatrix} \quad (1)$$

Equation (1) is an equation for evaluating the variations $\Delta\Theta l$, $\Delta\phi l$ and $\Delta\psi l$ of $\Theta$, $\phi$ and $\psi$ required for moving the path-controlled part 21 by $\Delta x$, $\Delta y$ and $\Delta z$.

$a_{11}$–$a_{55}$ are coefficients which are determined by the construction of the mechanism shown in FIG. 1.

The operated results obtained with Equation (1) are sent to the control means 46 through the line 49.

Upon receiving these outputs and further the outputs of the encoders 22, 23 and 24, the control means 46 sends signals corresponding to their differences to the drive means 3, 8 and 13, so as to actuate these means.

When the path-controlled part 21 has arrived at a desired coordinate position, the change-over switch 30 is returned to its neutral position.

Operations for positioning the path-controlled part 21 in the Y- and Z-directions can be readily inferred from the above description, and will not be explained. It is also possible to manipulate the switches 30, 31 and 32 at the same time.

Next, when it is desired to change only the angle $\alpha$ without changing the position of the path-controlled part 21, the switch 35 is thrown onto the side Pe, and the change-over switch 33 is thrown onto, for example, the side $+\alpha$. Then, $\Delta x=\Delta y=\Delta z1=\Delta\beta1=0$ and $\Delta\alpha l=$ const. are substituted into Equation (1). Thus, $\Delta\Theta l$, $\Delta\phi l$ and $\Delta\psi l$ are evaluated. These values are sent to the control means 46 through the line 49.

Upon receiving these outputs and further the outputs of the encoders 22, 23, 24 and 25, the control means 46 supplies the drive means 3, 8, 13 and 17 with signals corresponding to their differences, so as to actuate these means.

When the angle $\alpha$ has become a desired magnitude, the change-over switch 33 is returned to its neutral position.

Operations for changing the magnitudes of $-\alpha$, $+\beta$ and $-\beta$ without changing the position of the path-controlled part 21 can be readily inferred from the above description, and will not be explained. It is also possible to simultaneously change the magnitudes of the angles $\alpha$ and $\beta$ by simultaneously manipulating the switches 33 and 34.

When the position of the path-controlled part 21 and the magnitude of the angles $\alpha$ and $\beta$ have been brought into the desired states, the push button 36 provided on the console 27 is depressed. Then, information on $\Theta$, $\phi$, $\psi$, $\alpha$ and $\beta$ which the arithmetic means 45 is delivery at that time are written into the main storage means 37. When the writing has ended, the push button 36 is released, whereupon similar operations are carried out for new teach points.

Figure 5:
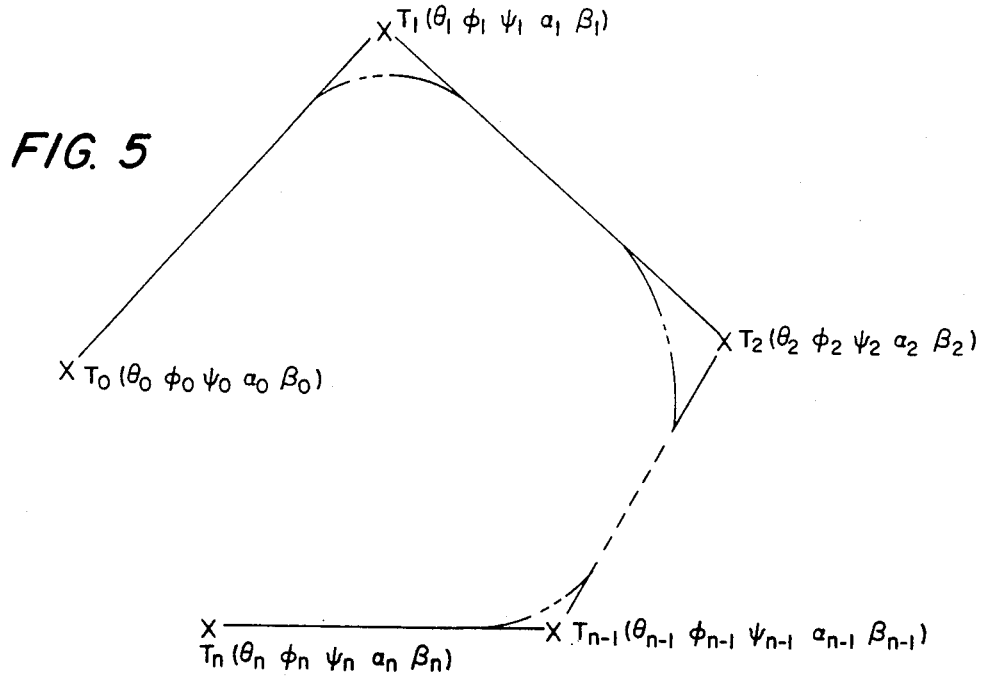
FIG. 5 is a diagram showing teach points.
Figure 4:
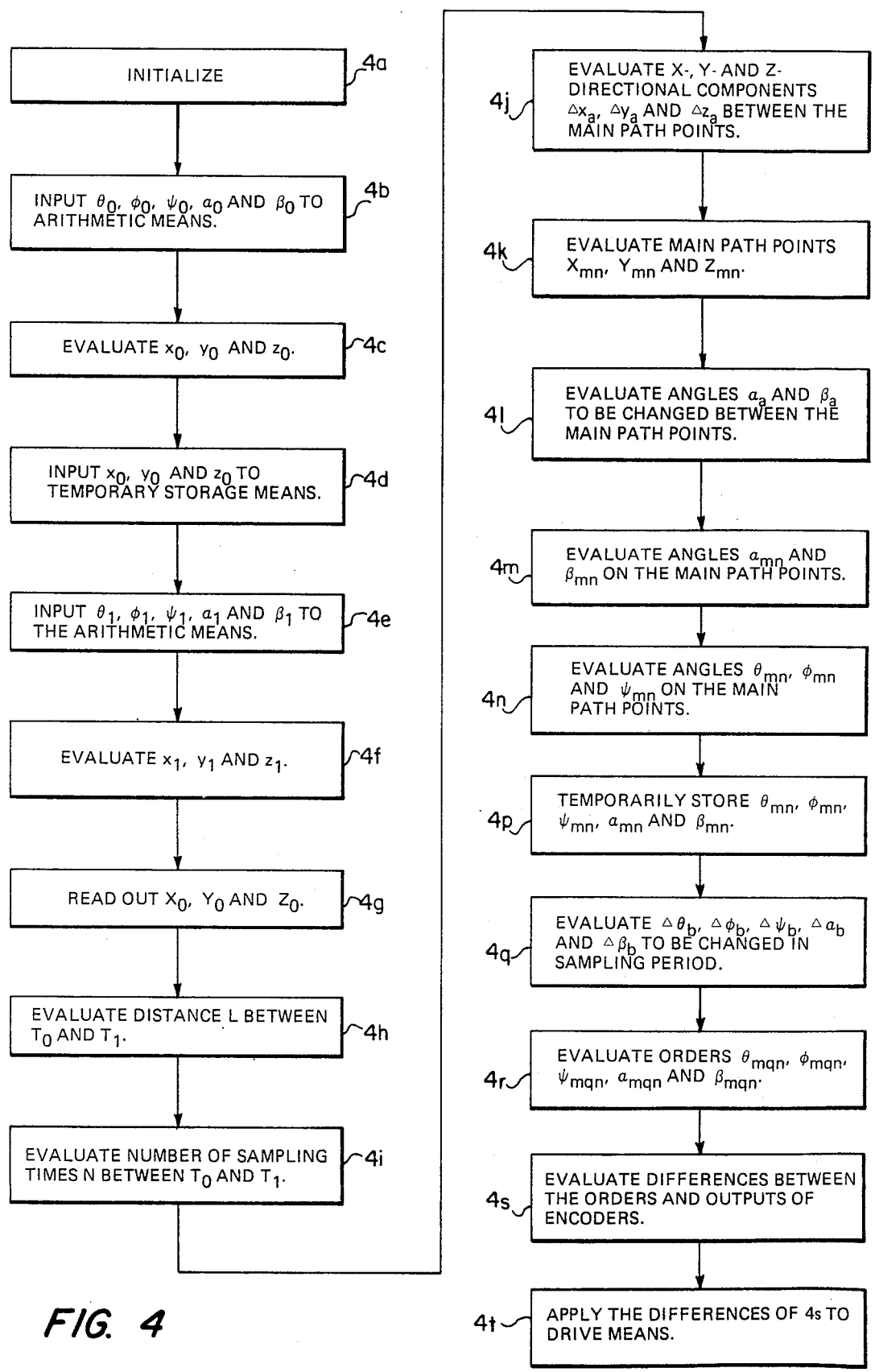
FIG. 4 is a flowchart showing the steps of the path control method of the present invention.
Figure 6:
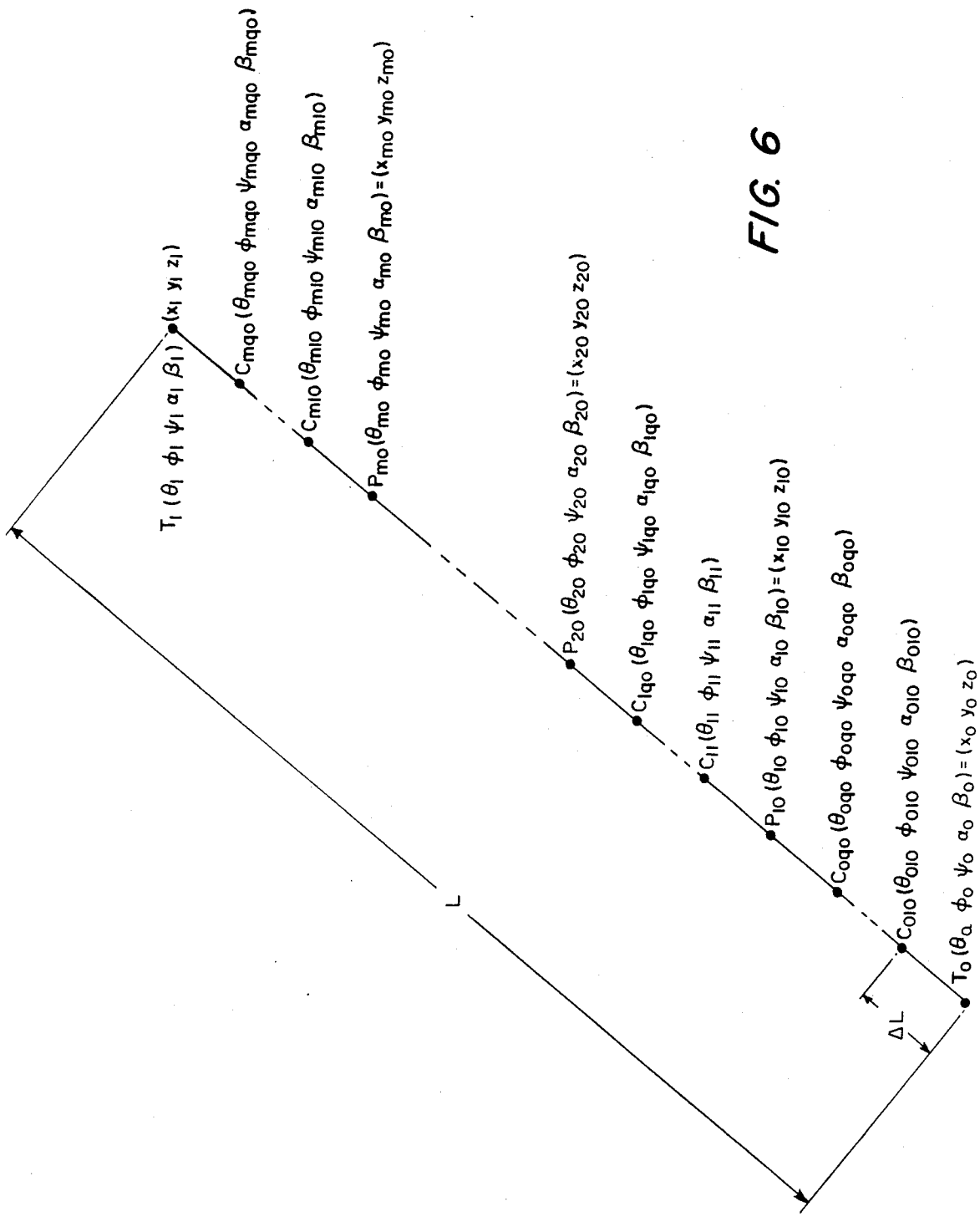
FIG. 6 is a diagram showing the relationship among teach points, main path points, commands and orders in the path control method of the present invention.

FIG. 4 shows the flow of the steps of the path control method of the present invention. It will be hereunder referred to, along with FIGS. 5 and 6, illustrative of teach points, etc.

When the automatic operation mode is to be established, the change-over switch 29 is thrown onto the side Au. Then, the apparatus is initialized as indicated by a block 4a in FIG. 4.

[First Operating Step]

Next, the general control means 39 feeds the outputs at $T_0$ ($\Theta_0$, $\phi_0$, $\psi_0$, $\alpha_0$, $\beta_0$) of the respective encoders 22, 23, 24, 25 and 26 into the arithmetic means 45 through a line 52 as indicated at 4b.

The position of the path-controlled part 21 at this time is supposed $T_0$.

As indicated at 4c, the arithmetic means performs a coordinate transformation by substituting ($\Theta_0$, $\phi_0$, $\psi_0$, $\alpha_0$, $\beta_0$) into Equation (2), to obtain the values $x_0$, $y_0$, and $z_0$ of the general coordinate system corresponding thereto:

$$\begin{pmatrix} X_n \\ Y_n \\ Z_n \\ \alpha_n \\ \beta_n \end{pmatrix} = A \begin{pmatrix} \theta_n \\ \phi_n \\ \psi_n \\ \alpha_n \\ \beta_n \end{pmatrix} \quad (2)$$

where A is a term composed of ($a_{11}$–$a_{55}$) in Equation (1).

As indicated at 4d, the general control means 39 writes ($x_0$, $y_0$, $z_0$) into the temporary storage means 44.

Subsequently, as indicated at 4e, the general control means 39 reads out teach point information ($\Theta_1$, $\phi_1$, $\psi_1$, $\alpha_1$, $\beta_1$) on a first teach point $T_1$, expressed by the construction of the moving object, from the main storage means 37 and inputs them to the arithmetic means 45.

As indicated at 4f, the arithmetic means 45 substitutes ($\Theta_1$, $\phi_1$, $\psi_1$, $\alpha_1$, $\beta_1$) into Equation (2), to obtain the values ($x_1$, $Y_1$, $z_1$) of the general coordinate system.

As indicated at 4g, the general control means 39 reads out $x_0$, $y_0$ and $z_0$ from the temporary storage means 44 and inputs them to the arithmetic means 45.

As indicated at 4h, the arithmetic means 45 calculates the distance L between the points $T_0$ and $T_1$ in accordance with Equation (3):

$$L = \sqrt{(X_n - X_{n-1})^2 + (Y_n - Y_{n-1})^2 + (Z_n - Z_{n-1})^2} \quad (3)$$

Further, as indicated at 4i, the arithmetic means 45 evaluates according to Equation (4) the number N of timing pulses which will be needed for moving the path-controlled part 21 from $T_0$ to $T_1$:

$$N = \frac{(B + 1)L}{\Delta L} \quad (4)$$

where L denotes the distance between the adjacent main path points, and B denotes the number of orders per axis to be obtained between the adjacent main path points. As shown in FIG. 6, each main path point is represented by a point "$P_0$". Interpolated points between starting point $T_0$ and the first main path point $P_{10}$, between successive main path points, and between main path point $P_{m0}$ and end point $T_1$ are defined by orders and represented by the points labeled "C".

Further, as indicated at 4j, the arithmetic means 45 evaluates the X-, Y- and Z-directional component distances $\Delta x_a$, $\Delta y_a$ and $\Delta z_a$ between the adjacent main path points $P_1$, $P_2$ ... and $P_n$, between the starting point $T_0$ and $P_1$ and between $P_n$ and the end point $T_1$ in accordance with (5)–(7):

$$\Delta x_a = \left( \frac{X_n - X_{n-1}}{N} \right)(B + 1) \quad (5)$$

$$\Delta y_a = \left( \frac{Y_n - Y_{n-1}}{N} \right)(B + 1) \quad (6)$$

$$\Delta z_a = \left( \frac{Z_n - Z_{n-1}}{N} \right)(B + 1) \quad (7)$$

As indicated at 4k, the arithmetic means 45 evaluates main path point commands $X_{mn}$, $Y_{mn}$ and $Z_{mn}$ which are the values of the main path points $P_1$, $P_2$ ... and $P_n$ on the general coordinate system, by substituting $\Delta x_a$, $\Delta y_a$ and $\Delta z_a$ into Equations (8), (9) and (10):

$$X_{mn} = X_O + m \Delta x_a \quad (8)$$
$$Y_{mn} = Y_O + m \Delta y_a \quad (9)$$
$$Z_{mn} = Z_O + m \Delta z_a \quad (10)$$

These operations are executed in synchronism with the timing pulses from the general control means 39.

[Second Operating Step]

As indicated at 4l, the arithmetic means 45 evaluates angles $\Delta\alpha_a$ and $\Delta\beta_a$ to change between the adjacent main path points $P_1$, $P_2$ ... $P_n$, between the starting point $T_0$ and $P_1$ and between $P_n$ and the end point $T_1$ by substituting $\alpha_0$, $\beta_0$, $\alpha_1$, $\beta_1$ and N into Equations (11) and (12):

$$\Delta\alpha_a = \frac{\alpha_n - \alpha_{n-1}}{N}(B + 1) \quad (11)$$

$$\Delta\beta_a = \frac{\beta_n - \beta_{n-1}}{N}(B + 1) \quad (12)$$

Next, as indicated at 4m, the arithmetic means 45 evaluates $\alpha_{mn}$ and $\beta_{mn}$ on the angles $\alpha$ and $\beta$ of the respective main path points $P_{10}$, $P_{20}$ ... and $P_{m0}$, expressed by the reference coordinate system of the moving object, by substituting $\Delta\alpha_a$ and $\Delta\beta_a$ into Equations (13) and (14):

$$\alpha_{mn} = \alpha_O + m \Delta\alpha_a \quad (13)$$
$$\beta_{mn} = \beta_O + m \Delta\beta_a \quad (14)$$

As indicated at 4n, the arithmetic means performs a coordinate transformation by substituting the values of $\alpha_{mn}$ and $\beta_{mn}$ and those of $X_{mn}$, $Y_{mn}$ and $Z_{mn}$ into Equation (15), to obtain commands $\Theta_{mn}$, $\phi_{mn}$ and $\psi_{mn}$ expressed by the reference coordinate system of the moving object.

$$\begin{pmatrix} \theta_{mn} \\ \phi_{mn} \\ \psi_{mn} \\ \alpha_{mn} \\ \beta_{mn} \end{pmatrix} = A^{-1} \begin{pmatrix} X_{mn} \\ Y_{mn} \\ Z_{mn} \\ \alpha_{mn} \\ \beta_{mn} \end{pmatrix} \quad (15)$$

These operations are executed in synchronism with the timing pulses from the general control means 39.

The values $\Delta Xa$, $\Delta Ya$, $\Delta Za$, $\Delta\alpha a$ and $\Delta\beta a$ may be also evaluated by using a velocity unit which is given as teaching information.

Equations using the velocity unit v are as follows:

$$\Delta Xa = \frac{X_n - X_{n-1}}{L} v \quad (5')$$

$$\Delta Ya = \frac{Y_n - Y_{n-1}}{L} v \quad (6')$$

$$\Delta Za = \frac{Z_n - Z_{n-1}}{L} v \quad (7')$$

$$X_{tn} = X_O + t\Delta Xa \quad (8')$$
$$Y_{tn} = Y_O + t\Delta Ya \quad (9')$$
$$Z_{tn} = Z_O + t\Delta Za \quad (10')$$

-continued $$\Delta\alpha a = \frac{\alpha_n - \alpha_{n-1}}{L} v \quad (11')$$

$$\Delta\beta a = \frac{\beta_n - \beta_{n-1}}{L} v \quad (12')$$

$$\alpha_{tn} = \alpha_O + t\Delta\alpha a \quad (13')$$
$$\beta_{tn} = \beta_O + t\Delta\beta a \quad (14')$$

[Storing Step]

As indicated at 4p, the commands $\Theta_{mn}$, $\phi_{mn}$, $\psi_{mn}$, $\alpha_{mn}$ and $\beta_{mn}$ are stored into the temporary storage means 44.

[Third Operating Step]

As indicated at 4q, the commands stored in the temporary storage means 44 are read out so as to evaluate the magnitudes of the signals of the respective axes, $\Delta\Theta_b$, $\Delta\phi_b$, $\Delta\psi_b$, $\Delta\alpha_b$ and $\Delta\beta_b$ to be changed in the sampling period, in accordance with Equations (16)–(20):

$$\Delta\theta_b = \frac{\theta_{mn} - \theta_{m(n-1)}}{B+1} \quad (16)$$

$$\Delta\phi_b = \frac{\phi_{mn} - \phi_{m(n-1)}}{B+1} \quad (17)$$

$$\Delta\psi_b = \frac{\psi_{mn} - \psi_{m(n-1)}}{B+1} \quad (18)$$

$$\Delta\alpha_b = \frac{\alpha_{mn} - \alpha_{m(n-1)}}{B+1} \quad (19)$$

$$\Delta\beta_b = \frac{\beta_{mn} - \beta_{m(n-1)}}{B+1} \quad (20)$$

Next, as indicated at 4r, $\Delta\Theta_b$, $\Delta\phi_b$, $\Delta\psi_b$, $\Delta\alpha_b$ and $\Delta\beta_b$ are substituted into Equations (21)–(25) so as to evaluate orders $\Theta_{mq}$, $\phi_{mq}$, $\psi_{mq}$, $\alpha_{mq}$ and $\beta_{mq}$ for the interpolation between the adjcent two sets of commands as expressed by the reference coordinate system of the moving object:

$$\theta_{mqn} = \theta_{mn} + q\Delta\theta_b \quad (21)$$
$$\phi_{mqn} = \phi_{mn} + q\Delta\phi_b \quad (22)$$
$$\psi_{mqn} = \psi_{mn} + q\Delta\psi_b \quad (23)$$
$$\alpha_{mqn} = \alpha_{mn} + q\Delta\alpha_b \quad (24)$$
$$\beta_{mqn} = \beta_{mn} + q\Delta\beta_b \quad (25)$$

Orders are similarly evaluated between $T_0$ and $P_{10}$ and between $P_{n0}$ and $T_1$. $C_{010}$ $C_0$ $q_0$, $C_{110}$ $C_1$ $q_0$, ... and $C_{m10}$ $c_m$ $q_0$ are the order points.

These operations are executed in synchronism with the timing pulses from the general control means 39.

[Fourth Operating Step and Driving Step]

The control means 46 evaluates the difference between the orders $\Theta_{mqn}$, $\phi_{mqn}$, $\psi_{mqn}$, $\alpha_{mqn}$ and $\beta_{mqn}$ and positional information expressive of the positions of the respective drive means 2, 8, 13, 17 and 19, namely, the outputs of the encoders 22–26 as indicated at 4s, and affords them to the corresponding drive means 3–19 as indicated at 4t.

Also the control means 46 evaluates the differences between the commands $\Theta_{mn}$, $\phi_{mn}$, $\psi_{mn}$, $\alpha_{mn}$ and $\beta_{mn}$ and the outputs of the encoders 22–26, and applies them to the corresponding drive means 3, 8, 13, 17 and 19.

They are applied along the path in a sequence of $C_{010}$, $C_{020}$..., $C_{0q0}$, $P_{10}$, $C_{110}$, $C_{1q0}$, ..., $P_{m0}$, $C_{m10}$, $C_{mq0}$ and $T_1$ as the values expressed by the reference coordinate system of the moving object. These values are successively inputted to the control means 46 in synchronism with the timing pulses from the general control means 39.

The general control means 39 reads out teach point information $\Theta_n$, $\phi_n$, $\psi_n$, $\alpha_n$ and $\beta_n$ expressive of teach points $T_2$, ..., $T_{n-1}$ and $T_n$ from the main storage means 37 in succession. The arithmetic means 45 evaluates main path points, commands and orders between the respective teach points, and applies them to the control means 46 in synchronism with the timing pulses.

The control means 46 supplies the respective drive means 3, 8, 13, 17 and 19 with signals which correspond to the differences between the commands or orders and the outputs of the encoders.

Accordingly, the path-controlled part moves substantially along the teach points and the main path points.

In evaluating the main path points between the teach points $T_n$ and $T_{n-1}$, both the teach points $T_n$ and $T_{n-1}$ can be obained on the basis of the information stored in the main storage means. Alternatively, the teach point $T_n$ is evaluated from the stored information of the main storage means, while the other teach point $T_{n-1}$ may be evaluated using the outputs of the encoders 22–26 at the time at which the path-controlled part 21 lies near the point $T_{n-1}$.

The path-controlled part 21 need not always pass the teach points. As disclosed in U.S. Pat. No. 3,661,051, when the pathcontrolled part has come very close to a teach point, the next teach point is read out from storage means, whereby the pathcontrolled part can be moved along a shorter path as illustrated by each two-dot chain line in FIG. 5 by way of example.

The main storage means 37 can also store the teach point information as the values X, Y and Z expressed by the general coordinate system and the angular information $\alpha$ and $\beta$.

In writing the teach points, the outputs of the respective positional detectors can be written instead of the signals delivered by the arithmetic means.

According to the present invention, as understood from the above description, commands are obtained by operations attended with coordinate transformations, while orders of easy operations attended with no coordinate transformations are obtained between the commands, and a moving object is driven on the basis of these commands and orders, so that a large number of path points can be evaluated without considerably lengthening an operating period of time. Accordingly, the path of a path-controlled object is stabilized.

What is claimed is:

1. In a method wherein a path-controlled part is driven by a plurality of arms controlled in and defining a reference coordinate system in which points are designated by at least one angular quantity, a path control method comprising:

providing a teach point information signal that represents teach points to define a path for the part;

calculating a main path point different from the teach points, from the teach point information signal, said teach points being expressed in a general purpose coordinate system different from said reference coordinate system;

calculating a command signal representing the main path point expressed in the reference coordinate system from the main path point through a coordinate transformation;

calculating in the reference coordinate system an order expressed in the reference coordinate system and defining a new point along the path from two of said signals; and using said order to move the path-controlled part according to the path determined.

2. A path control method according to claim 1, wherein the main path point and the new point defined by the order are calculated through interpolation.

3. A path control method wherein the path-controlled part is driven in at least two dimensions according to claim 2, further comprising:

the step of sensing positional information of the arms;

the step of calculating differences between the order and the positional information; and the step of applying signals expressive of the differences to corresponding drive means for the arms.

4. A path control method according to claim 3, further comprising the step of storing the command signal into temporary storage.

5. A path control method according to claim 3, wherein the interpolation in the step of calculating the order is performed by equally dividing the differences between said signals.

6. A path control method according to claim 5, further comprising the step of providing a velocity unit with said teach point information signal, wherein the order is calculated by an equation using the velocity unit.

7. A path control method according to claim 5, further comprising the step of calculating a number of timing pulses, and wherein the order is calculated by an equation using the number of timing pulses.

8. A path control method according to claim 2, further comprising the step of sensing positional information of the arms, wherein the positional information of the arms is provided as a teach point information signal.

9. A path control method according to claim 3, further comprising the step of sensing positional information about a point defined by the arms when the path controlled part approaches a teach point, and wherein a main path point succeeding the teach point being approached is calculated from the positional information and the teach point information about the teach point next succeeding the teach point being approached.

10. A path control method according to claim 1, wherein the path-controlled part is a part of a robot.

11. A path control method according to claim 10, wherein the main path point and the new point defined by the order are calculated through interpolation.

12. A path control method wherein the path-controlled part is driven in at least two dimensions according to claim 11, further comprising:

the step of sensing positional information of the arms;

the step of calculating differences between the order and the positional information; and the step of applying signals expressive of the differences to corresponding drive means for the arms.

13. A path control method according to claim 12, further comprising the step of storing the command signal into temporary storage.

14. A path control method according to claim 12, wherein the interpolation in the step of calculating the order is performed by equally dividing the differences between said signals.

15. A path control method according to claim 14, further comprising the step of providing a velocity unit with said teach point information signal, wherein the order is calculated by an equation using the velocity unit.

16. A path control method according to claim 14, further comprising the step of calculating a number of timing pulses, and wherein the order is calculated by an equation using the number of timing pulses.

17. A path control method according to claim 12, further comprising the step of sensing positional information of the arms, wherein the positional information of the arms is provided as a teach point information signal.

18. A path control method according to claim 11, further comprising the step of sensing positional information about a point defined by the arms when the path controlled part approaches a teach point, and wherein a main path point succeeding the teach point being approached is calculated from the positional information and the teach point information about the teach point next succeeding the teach point being approached.

19. In a method wherein a path-controlled part is driven by a plurality of arms controlled in and defining a reference coordinate system in which points are designated by at least one angular quantity, a path control method comprising:

providing a teach point information signal that represents teach points to define a path for the part;

calculating through interpolation a main path point different from the teach points, from the teach point information signal, said teach points being expressed in a general purpose coordinate system different from said reference coordinate system;

calculating a command signal representing the main path point expressed in the reference coordinate system from the main path point through a coordinate transformation;

calculating in the reference coordinate system an order expressed in the reference coordinate system and defining a new point along the path from two of said signals that are expressed in the reference coordinate system by using only addition, subtraction, division and multiplication in the reference coordinate system through interpolation;

sensing positional information about the arms;

calculating differences between the order and the positional information; and driving the arms in response to signals expressive of the differences to move the path controlled part toward the new point designated by the order.

20. A path control method according to claim 19, wherein the path-controlled part is a part of a robot.

21. A path control method according to claim 20, further comprising the step of storing the command signal into temporary storage.

22. A path control method according to claim 20, wherein the interpolation in the step of calculating the order is performed by equally dividing the differences between said signals.

23. A path control method according to claim 22, further comprising the step of providing a velocity unit with said teach point information signal, wherein the order is calculated by an equation using the velocity unit.

24. A path control method according to claim 22, further comprising the step of calculating a number of timing pulses, and wherein the order is calculated by an equation using the number of timing pulses.

25. A path control method according to claim 20, further comprising the step of sensing positional information of the arms as the path controlled part approaches a teach point, wherein the positional information of the arms is provided as a teach point information signal.

26. A path control method according to claim 20, further comprising the step of sensing positional information about a point defined by the arms when the path controlled part approaches a teach point, and
wherein a main path point succeeding the teach point being approached is calculated from the positional information and the teach point information about the teach point next succeeding the teach point being approached.

27. A path control method according to claim 19, wherein said reference coordinate system is a polar coordinate system and said general coordinate system is a cartesian coordinate system.

28. A path control method according to claim 19, wherein the path-controlled part is driven in three dimensions.

29. In an apparatus wherein a path-controlled part is driven by a plurality of arms controlled in and defining a reference coordinate system in which points are designated by at least one angular quantity, apparatus for driving a path-controlled part in the reference coordinate system comprising:
means for providing a teach point information signal that represents teach points to define a path for the part;
means for calculating a main path point different from the teach points, from the teach point information signal, said teach points being expressed in a general purpose coordinate system different from said reference coordinate system, for calculating a command signal representing the main path point expressed in the reference coordinate system from the main path point through a coordinate transformation, and for calculating in the reference coordinate system an order expressed in the reference coordinate system and defining a new point along the path from two of said signals; and
means for driving the arms in response to said order.

30. Apparatus according to claim 29, wherein the main path point and the new point defined by the order are calculated through interpolation.

31. Apparatus wherein the path-controlled part is driven in at least two dimensions according to claim 30, further comprising:
means for sensing positional information of the arms;
means for calculating differences between the order and the positional information; and
means for applying signals expressive of the differences to said drive means for the arms.

32. Apparatus according to claim 31, further comprising means for storing the command signal into temporary storage.

33. A path control method according to claim 31, wherein the interpolation in the step of calculating the order is performed by equally dividing the differences between said signals.

34. Apparatus according to claim 33, further comprising means for providing a velocity unit with said teach point information signal, and
wherein the order is calculated by an equation using the velocity unit.

35. Apparatus according to claim 33, further comprising means for calculating a number of timing pulses, and
wherein the order is calculated by an equation using the number of timing pulses.

36. Apparatus according to claim 30, further comprising means for sensing positional information about the arms, wherein the positional information about the arms is provided to said means for providing said teach point information signal.

37. Apparatus according to claim 31, further comprising means for sensing positional information about a point defined by the arms when the path controlled part approaches a teach point, and wherein a main path point succeeding the teach point being approached is calculated from the positional information and the teach point information about the teach point next succeeding the teach point being approached.

38. Apparatus according to claim 29, wherein the path-controlled part is a part of a robot.

39. Apparatus according to claim 38, wherein the main path point and the new point defined by the order are calculated through interpolation.

40. Apparatus wherein the path-controlled part is driven in at least two dimensions according to claim 39, further comprising:
means for sensing positional information of the arms;
means for calculating differences between the order and the positional information; and
means for applying signals expressive of the differences to said drive means for the arms.

41. Apparatus according to claim 40, further comprising means for storing the command signal into temporary storage.

42. A path control method according to claim 40, wherein the interpolation in the step of calculating the order is performed by equally dividing the differences between said signals.

43. Apparatus according to claim 42, further comprising means for providing a velocity unit with said teach point information signal, and
wherein the order is calculated by an equation using the velocity unit.

44. Apparatus according to claim 42, further comprising means for calculating a number of timing pulses, and
wherein the order is calculated by an equation using the number of timing pulses.

45. Apparatus according to claim 39, further comprising means for sensing positional information about the arms, wherein the positional information about the arms is provided to said means for providing said teach point information signal.

46. Apparatus according to claim 40, further comprising means for sensing positional information about a point defined by the arms when the path controlled part approaches a teach point, and wherein a main path point succeeding the teach point being approached is calculated from the positional information and the teach point information about the teach point next succeeding the teach point being approached.

47. In an apparatus wherein a path controlled part is driven by a plurality of arms controlled in and defining a reference coordinate system in which points are designated by at least one angular quantity, apparatus for driving a path-controlled part in the reference coordinate system comprising:

means for providing a teach point information signal that represents teach points to define a path for the part;

means for calculating through interpolation a main path point different from the teach points, from the teach point information signal, said teach points being expressed in a general purpose coordinate system different from said reference coordinate system, for calculating a command signal representing the main path point expressed in the reference coordinate system from the main path point through a coordinate transformation, and for calculating in the reference coordinate system an order expressed in the reference coordinate system and defining a new point along the path from two of said signals that are expressed in the reference coordinate system using only addition, subtraction, division and multiplication in the reference coordinate system through interpolation;

means for sensing positional information about the arms;

means for calculating differences between the order and the positional information; and means for driving the arms in response to signals expressive of the differences to move the path-controlled part toward the point represented by the order.

48. Apparatus according to claim 47, wherein the path-controlled part is a part of a robot.

49. Apparatus according to claim 48, further comprising means for storing the command signal into temporary storage.

50. A path control method according to claim 48, wherein the interpolation in the step of calculating the order is performed by equally dividing the differences between said signals.

51. Apparatus according to claim 50, further comprising means for providing a velocity unit with said teach point information signal, and
wherein the order is calculated by an equation using the velocity unit.

52. Apparatus according to claim 50, further comprising means for calculating a number of timing pulses, and
wherein the order is calculated by an equation using the number of timing pulses.

53. Apparatus according to claim 48, further comprising means for sensing positional information of the arms, and wherein the positional information of the arms is provided by said means for providing teach point information signal.

54. Apparatus according to claim 48, wherein said means for sensing positional information about the arms provides positional information when the path controlled part approaches very close to a point expressed by the teach point information, and wherein the main path point is calculated by the positional information and the teach point information next subsequent to the point.

55. Apparatus according to claim 47 wherein said reference coordinate system is a polar coordinate system and said general coordinate system is a cartesian coordinate system.

56. Apparatus according to claim 47, wherein the path-controlled part is driven in three dimensions.

* * * * *